Feb. 10, 1931.    E. L. OBERLY ET AL    1,791,532
SEMIAUTOMATIC DRILL AND TAPPING JIG
Filed Nov. 11, 1924    4 Sheets-Sheet 1

Inventors
Eugene L. Oberly and
Henry Hansen.
By
Mason, Fenwick & Lawrence Attys.

Patented Feb. 10, 1931

1,791,532

UNITED STATES PATENT OFFICE

EUGENE L. OBERLY AND HENRY HANSEN, OF CHICAGO, ILLINOIS

SEMIAUTOMATIC DRILL AND TAPPING JIG

Application filed November 11, 1924. Serial No. 749,268.

Our invention relates to metal working machinery and more especially to a device in the nature of a drill adapted to be applied to a conventional drilling machine to render the same semi-automatic in its operation and also provide a tapping jig.

The invention comprises a semi-automatic drill and tapping jig adapted for conveniently and efficiently holding small objects to be drilled and tapped, novel features thereof consisting in providing a device which will firmly grip an article or object constituting the work to be operated on but inserted by hand, and will permit the same to be tapped or drilled, or provided with screw threads where necessary, and which will act during the operation of the drill in presenting the drill tool or tapping tool to the work and discharge the same at one side of the machine to be caught in a suitable receptacle upon the release of the machine for return to its normal position or by hand manipulation, as desired.

A further object of the invention is to provide novel gripping means for the work, together with novel means for releasing the work to permit discharge or dropping of the same out of operative position when released by the holding jaws.

A still further object of the invention is to provide a work holding device including jaws to receive the work and firmly hold the same to permit the work to be operated on, tapped or the like, and which is capable of attachment or applicable to drills of standard construction without special or material alterations and which can be quickly applied or removed, in addition to being positive in operation, strong and durable and not likely to get out of working order, as well as providing for efficiency and economy in production and so as to expedite the work in question whereby quantity production is facilitated.

With the above and other objects in view, the invention consists of certain novel combinations and arrangements of parts to be hereinafter more fully set forth and described.

By way of illustrating a practical embodiment of the invention, one of many forms of construction is shown in certain of the drawings and another form in another illustration for operation during the operation of the machine and by hand apart from the operation of the machine or drill.

In the present embodiment elected for illustration as demonstrated by practice and in the accompanying drawings:

Fig. 1 is a perspective view of a semi-automatic drill and tapping jig constituting my invention, the drill being shown with the attachment or parts secured thereto.

Fig. 7 is a sectional end elevation, the section being taken on the plane of the section line 7—7 in Fig. 2, to illustrate the mounting of the slides holding the gripping jaws.

Fig. 11 is a perspective view of one of the clamping jaws for engaging and holding the work to be operated on.

Fig. 12 is a sectional elevation showing a piece of work and the operation effected thereon, said work being illustrated in the form of a faucet handle shown in position to be operated on in Figs. 4 and 5 of the drawings, although it is to be understood that we are not restricted to any particular work and that a variety of shapes of work or devices may be held by the jaws and operated on by the drill in connection with the attachments and combination constituting the invention.

Figures 1, 11, 12:
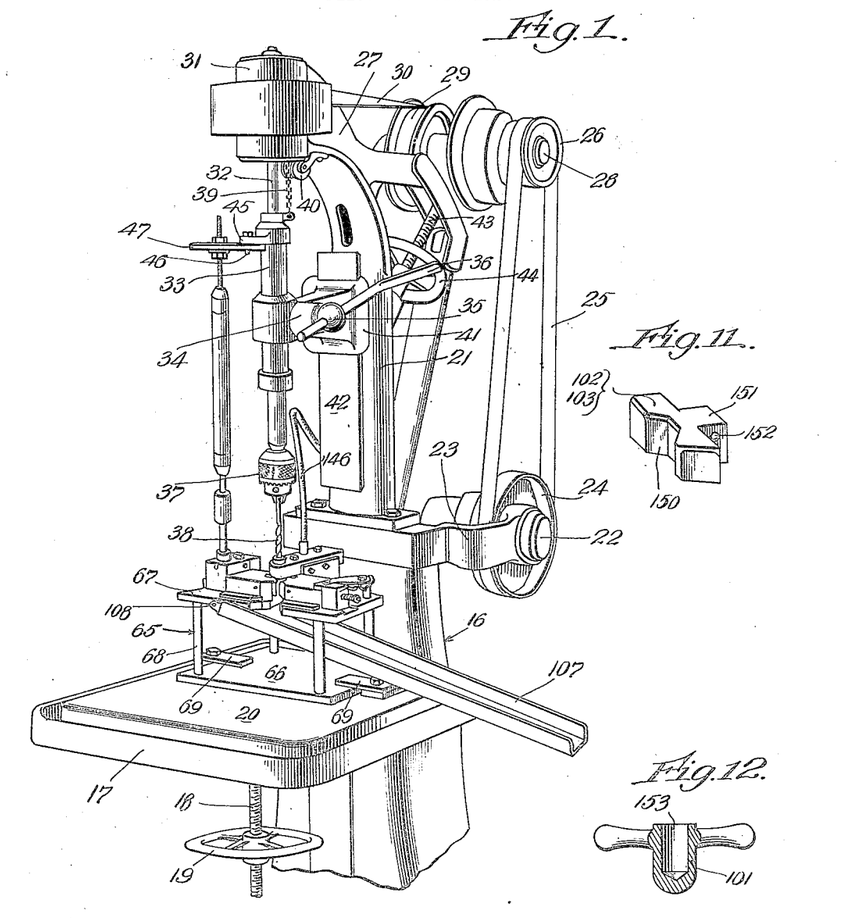

Referring to the drawings in detail, in which like reference characters designate corresponding parts throughout the several views, there is shown in Fig. 1 of the drawings and continued through Fig. 12 of the drawings, a conventional drill of the metal working type generally designated at 16 and including a vertical frame mounted upon a suitable base which carries a vertically adjustable support or horizontal work table 17 capable of adjustment through the medium of the screw 18 and operating wheel 19 or otherwise. The table is adapted to support a wood or other bed plate 20 arranged to support the jig or work holding device and associated parts to be hereinafter more fully described. The drill has a standard 21 and is provided with a suitable motor or power device for driving a shaft 22 journalled in the rear of the frame upon suitable bearings as indicated at 23 and carrying a pulley or other drive wheel 24 around which a belt 25 is trained. The belt 25 is also trained around a smaller pulley or drive wheel 26 positioned above the pulley 24 and journalled in an arm or hanging part 27 of the frame near the top of the standard 21, the pulleys having a plurality of surfaces or pulleys of varying size with the large ones at the bottom opposing the small ones at the top and vice versa to vary the speed of rotation of the shaft 28 in the usual manner. The shaft 28 carries a pulley 29 around which a twisted belt or drive member of endless formation indicated at 30, is trained, the latter extending around a horizontally positioned drive member 31 journalled in an overhanging upwardly and forwardly curved upper portion of the standard 21 as in conventional drills. By this means a shaft 32 depending from the pulley 31 may be rotated and the latter is provided with a housing or casing 33 enclosing the usual rack or gear teeth to be engaged by a vertical pinion or spur gear carried by a horizontal shaft journalled in a bearing 34 and having one end 35 provided with a handle 36 or cross bar by which the shaft may be turned to raise and lower the housing 33 and the drill chuck and drill 37 and 38 respectively carried at the lower end thereof, the drill being gripped in the chuck in the usual manner. Obviously, any special form of tool may be held by the chuck 37 in lieu of the drill 38 for tapping, drilling, threading or other operation well known in the art. The housing, chuck and drill are held normally elevated if desired, by the usual counterweights including a flexible member or chain 39 connected to the upper end thereof and trained over a guide wheel or pulley 40 and then connected to a counterweight operating in rear of the standard 21 or frame 16 as is common in the art. In addition, the bearing 34 is carried by a slide 41 which is capable of vertical adjustment or sliding movement on the track or slide 42 at the front of the standard 21 to enable elevation or lowering of the pinion and thereby to vary the degree of lowering and thus the position of the drill or other tool with respect to the work. Furthermore, the drill may be equipped with the usual adjusting screw 43, adjustment being effected through the medium of the operating wheel 44 for the usual purpose.

The casing or housing 33 constituting a vertical slide held by the slide 41 and bearing 34, is provided with an apertured outstanding or horizontally extending lug 45 near its upper end, to which is bolted or held by a screw 46, an arm or angularly extending plate 47, the inner end of the arm having a recess 48 to fit the conformation or circular face of the housing or casing 33 whereby when the arm 47 is secured by the screw or bolt 46, the arm 47 is held in a fixed position or from moving in angular relation to its clamped position so attached to the upper end of the slide housing 33. The free end of the arm 47 is provided with an aperture 49 threaded or un-threaded, to receive the threaded upper end of a rod 50 which is held clamped in an adjusted position by means of upper and lower nuts 51 and 52 positioned above and below the arm 47 with interposed washers 53 and 54. By this means, the threaded rod 50 is held in positive relation to its adjusted position in the arm 47 but is capable of vertical adjustment therein as desired, to vary the differential movement between the arm with the drill housing, chuck and drill held by the latter as will be made apparent as the description proceeds.

Figures 2, 8, 9, 10:
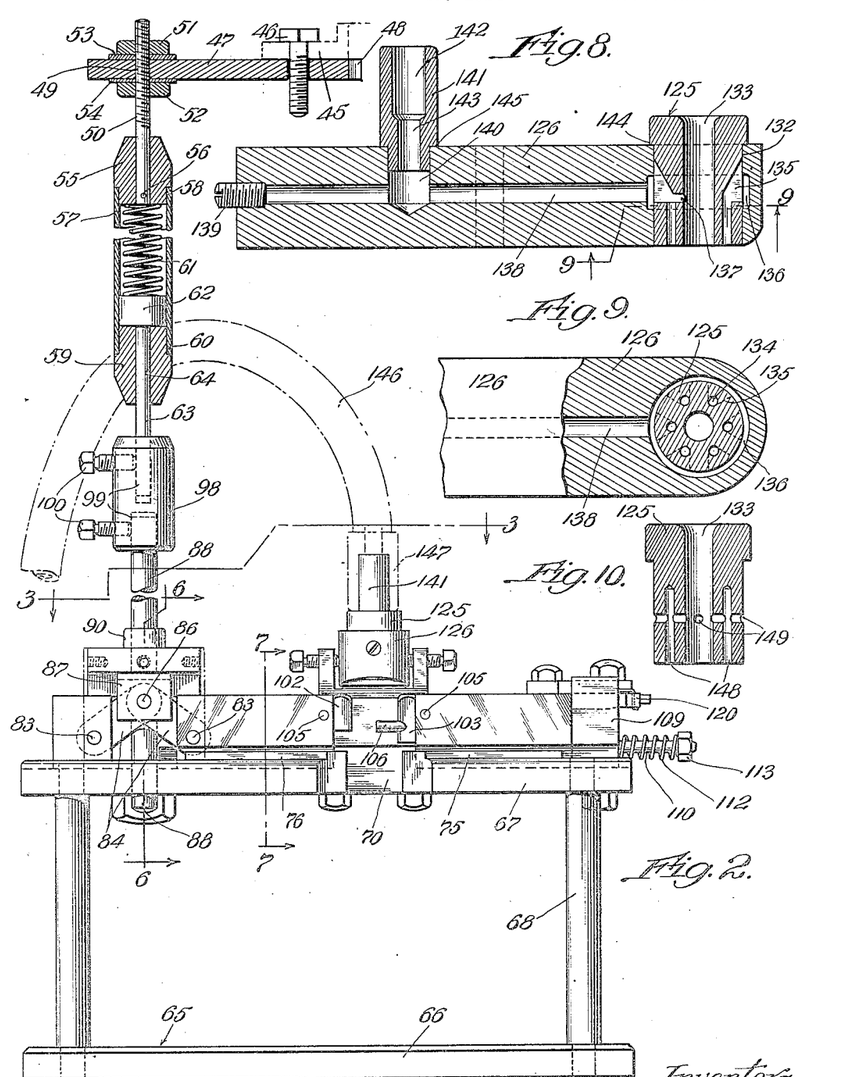
Fig. 2 is an enlarged front elevation of the attachment disconnected from the machine or drill and showing the same partly in section to more clearly illustrate the construction and operation.
Fig. 8 is an enlarged vertical sectional view of the drill guide and construction for supplying water or oil, or both to the drill and work for the purpose of lubrication and cleaning the shavings of material removed by the drill or other tool.
Fig. 9 is a fragmentary sectional plan view of the construction shown in Fig. 8, the same being taken on the staggered section line, the plane of which is designated at 9—9 in Fig. 8.
Fig. 10 is a vertical sectional view of a modification of the drill guide and showing another method of putting the water and oil channels therein.

A head 55 is fixed or pinned to the lower end of the threaded rod 50 as indicated at 56, which pin also serves to retain a cylindrical or other shaped tube 57 thereto, said tube fitting on a reduced lower end of the head 55 as particularly shown in Fig. 2 of the drawings at 58, and having a foot piece or bottom guide piece 59 secured in a similar manner in its lower end, that is, over a reduced upper end portion of the head 59 as at 60. A helical coil spring 61 is positioned in the tube or casing 57 between the head 55 and a plunger 62 moveable in the lower portion of the tube, the plunger having a stem 63 operating in an axial opening 64 in the foot piece or bottom guide member 59 to cushion the movements and establish a differential or variation in the movement of the stem and the vertically moveable drill shaft, housing, chuck and drill for a purpose to be hereinafter made apparent.

The tapping jig includes a frame 65 comprising spaced parallel plates connected in rigid relation and including a base plate 66 and a top plate 67 connected at the corners by rigid spacing members 68. The base plate 66 is held on the bed plate 20 of the work table as by means of clamps 69 as seen more particularly in Fig. 1 of the drawings. The top or head plate 67 is provided with a front opening 70 and a longitudinal groove 71 intersecting the opening normally or at right angles thereto for the reception of slides 72 and 73 shown in the form of blocks with side grooves 74 running longitudinally and receiving the inner edges of retainer plates 75 detachably screwed or secured to the top plate 67 as indicated at 76, whereby the parts can be readily assembled or detached for repair, replacement or otherwise. The slide 73 includes an angular part comprising a slide or block 77 having a longitudinal extension at the rear as indicated at 78 extending back of and alongside the slides 72 and 73 as more particularly illustrated in Figs. 3, 4 and 5 of the drawings. The free end of the extension 78 is slotted, the two slots 79 receiving clamping screws 80 for adjustably connecting the block 77 with the slide 73 to vary the relative and degree of movement imparted to the slides 72 and 73 as will be further explained.

The parts 77 and 72 are spaced apart at the outer end of the latter as indicated at 81 and the adjacent spaces are recessed as indicated at 82 to receive pins 83 for pivotally connecting the outer ends of toggle links 84 to the slides 72 and 77—73. The inner ends of the toggle links 84 are reduced in thickness to moveably overlap one another as indicated at 85 and pivotally connected by the pin 86 in a block 87 suitably recessed or grooved for the purpose as shown in Figs. 2 to 6 inclusive of the drawings. The pin 86 passes through a vertical rod 88 which passes through an opening 89 in the top plate 67 for vertical movement and through a guide bearing or sleeve 90 mounted in an overhanging arm 91 forming the top plate of a housing or cover over the toggle connection between the rod 88 and the jaws 72 and 73 through the parts 77 and 72. The cover includes a body 92 bolted to the frame 65 as indicated at 93, said bolt extending in through the top plate 67 after passing through an aperture 94 in the body or casting 92. The cover includes side plates 95 secured by screws or the like 96 and a similarly secured front plate 97 so as to enclose the parts of the toggle joints and the plunger rod 88 whereby chips, shavings or the like are prevented from getting into the parts and interfering with their movement as well as to prevent the same from clogging up with dirt or foreign matter, thus facilitating lubrication and maintenance of the parts in working condition when lubricated. In Fig. 2 of the drawings, the front cover plate 97 is removed for convenience of illustration. It will also be noted that the rod 88 extends above the bearing sleeve or bushing 90 and is connected to the plunger rod or stem 63 through the medium of a coupling 98, the opposite ends of which are provided with openings or sockets of varying size as indicated at 99 to receive rods 63 and 68 held by clamping screws 100, whereby the parts may be firmly connected in adjusted relation but adjusted when desired according to the movement desired to be imparted to the toggle connection with the slide.

The opening or recess 70 is preferably enlarged or flared at the front to facilitate the insertion or entrance of the work such as a faucet handle 101, the latter being held by gripping jaws 102 and 103 removably mounted in the opposed grooved faces 104 of the slides 72 and 73 as by means of pins 105 inserted in openings of the grooved and slotted opposed inner faces of such slides as it is thought will be clearly understood from an inspection of the drawings. The jaw faces of the jaws 102 and 103 may be shaped for the special work on hand, the faces of these gripping jaws varying in accordance with the work to be held thereby as it is thought, will be apparent. Specifically, the work is shown held or supported on longitudinally retractable and moveable pins 106 which support the work in position to permit the same to be gripped by the jaws 102 and 103 or released and dropped into a chute 107 for discharge in a suitable receptacle at one side of the machine after the work has been completed or the special operations thereon carried out. The chute 107 is shown of channel cross section and is preferably formed of sheet metal. It extends over the bed plate 20 and between the top and bottom plates 67 and 66 of the frame 65, being secured to the top plate 67 as indicated at 108 in Fig. 1 of the drawings so as to lie directly beneath the opening between the jaws in position to receive the work 101 when released by the retraction of the pins 106 into the face of the jaw 103 and the slide 73 as will be later described.

The pins 106 are moveably mounted in openings in the slide 73 and have outer ends anchored in a block 109 abutting the outer end of the slide 73 and likewise slideable in the groove 71, but moveable independently of as well as simultaneously with said slide. The block 109 is moveable on a pin or rod 110 in the form of a screw passing loosely through the block 109 and threaded in the slide 73 as indicated at 111. A spring 112 is mounted on the guide rod 110 and is held in position by a nut 113 which also serves to adjust the tension of the spring 112 tending to hold the block in contact with the slide 73 and the pins projected from the jaw 103 to support the work 101. An arm 114 is rigid with the guide 73 through the medium of the bolt 115 and the pins 116, and extends rearwardly and outwardly at an obtuse angle for pivotal connection as indicated at 117 with a dog 118 pivoted at its inner end as indicated at 119 to the top plate 67 of the frame 65. The free or forward end of the dog 118 is adapted to swing in the path of a pawl 120 which is disposed in a slot 121 in the block 109 and pivoted therein as indicated at 122, a screw being used for this purpose preferably. The pawl 120 has a projecting end 123 extending inwardly and rearwardly for engagement with the angular pointed end of the dog 118 at the forward end of the latter, and is held rearwardly by means of a spring 124, normally in the path of the dog for the purpose to be hereinafter more fully explained in connection with the operation of the device.

Figure 3:
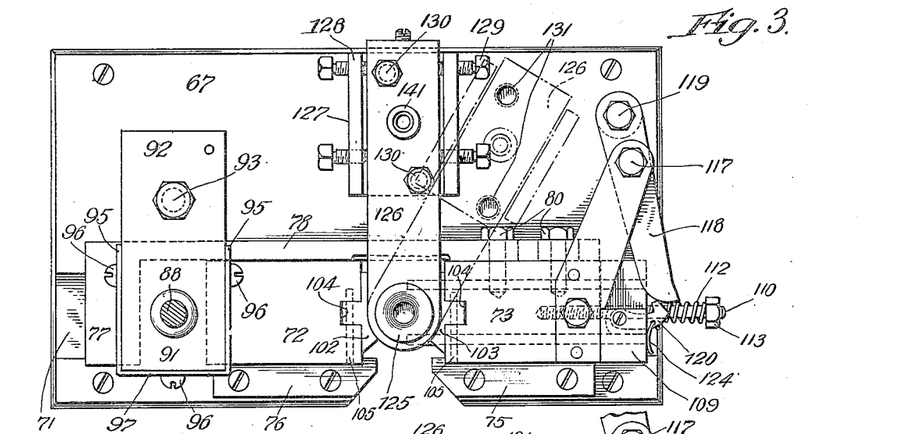
Fig. 3 is a sectional plan view of the construction shown in Fig. 2, the same being taken on the plane of the section line of staggered form shown at 3—3 in Fig. 2 of the drawings.

The drill 38 or other suitable tool for operating upon the work, operates through a bushing 125, said bushing being mounted in a drill guide or arm 126 held in a clamp 127 comprising a channel shaped member having side plates 128 through which are mounted set-screws 129, preferably two on each side for engaging the sides of the arm 126 of the drill guide so as to detachably secure the latter in position and permit necessary adjustment thereof to bring the bushing 125 in proper position between the slides 72 and 73 and the jaws 102 and 103, as clearly shown is Fig. 3 of the drawings, and to center the same for receiving the drill or other tool. Screws 130 are provided at diagonally opposite points on the arm 126 of the drill guide to anchor the same together with the clamp 127 on the head or top plate 67, said screws being passed vertically to engage sockets or threaded holes in the top plate 67. An additional set of said sockets or holes may be provided in the top plate 67 at one or each side as indicated at 131 in Fig. 3 of the drawings, so that the angular position of the arm or drill guide 126 may be changed to permit clearance of certain types of work, this permitting angular adjustment as it is thought will be apparent.

The arm or drill guide 126 is provided with a rounded forward end, in the preferred construction, cut on a concentric curve with the axis of a circular opening 132 vertically in said arm from top to bottom, to receive the bushing 125. The bushing has a central opening 133 as shown in Figures 8 and 9 for receiving drill or other tool and is also formed with a concentric series of vertical apertures or ducts 134 extending upwardly from the lower end thereof and communicating with a series of intermediate V-shaped recesses 135 extending through the periphery thereof and communicating with an annular channel 136 in the adjacent intermediate portion of the wall of the opening 132. One or more of the recesses 135 communicates with the bore or passage 133 through a port or opening 137, thus establishing communication through all of said openings and recesses with the drill tool and a suitable means for supplying water or oil or both, through the medium of a longitudinal passage 138 in the arm 126. The inner end of the passage 138 is closed by a plug or screw 139 which permits the opening to be drilled and then tapped to receive the plug so that the passage can be cleaned when desired. About intermediately of the length of the arm 126, as regards that portion mounted in the clamp 127, a vertical passage 140 is provided adapted to receive a sleeve 141 having a passage 142 provided with a reduced portion 143 communicating with the opening or passage 140 which extends down and communicates with the longitudinal passage 138. The bushing 125 is provided with an enlarged top portion or head forming a shoulder 144 which supports the bushing on the drill guide or arm 126 and the sleeve 141 is provided with a similar shoulder 145 which supports the same on the arm in a similar manner. The enlarged portion 142 is adapted to receive the end of a flexible hose or pipe line 146 having a coupling or head 147 to slip over the sleeve 141 and form a liquid tight connection therewith. For this purpose, the coupling or head 147 may be of rubber or other suitable material and the hose or pipe line 146 is adapted to receive a supply of oil or water or both for the purpose of distributing the same to the drill guide bushing 125 and thoroughly lubricating and cleaning the parts and the drill so as to remove foreign matter and flush the cuttings or shavings cut by the drill or other tool and insure proper cooling and lubrication whereby the work may be efficiently carried on without over-heating and undue friction.

The drill guide bushing just described is shown in Figs. 8 and 9 of the drawings and in Fig. 10 of the drawings another form or modification of the drill guide bushing is shown, in which a series of vertical ducts or passages 148 are provided concentrically to the axial or central vertical passage or bore 133 and holes 149 are drilled through the wall of the bushing to the inside to provide openings corresponding to the opening or openings 137, these openings 149 running transversely at right angles to the passages or ducts 148 and in line with the latter so as to intersect the same as clearly shown in Fig. 10. This construction obviates the necessity of cutting the recesses 135 as disclosed in Figs. 8 and 9 of the drawings.

In Fig. 11 of the drawings, the construction of the jaws 102 and 103 is illustrated, the same having a recess 150 to accommodate the work 101 shown in the present instance as a faucet handle. Each jaw is provided with a reduced central lateral extension or shank 151 provided with an opening 152 for receiving a pin 105 as previously explained after being positioned in the groove or recess 104 running vertically of the inner end of each slide 72 and 73, thereby retaining the jaws in position. As previously explained, the formation of the jaws may be varied for the different types of work to be tapped or operated on. By way of example, and not for the purpose of restricting the invention to the particular use, the drill is adapted to tap the faucet handle at its central body portion as indicated in Fig. 12 of the drawings at 153, while the work is held between the jaws as already explained, after which the work is released and discharged from the chute 107 as will be pointed out in detail.

Figure 4:
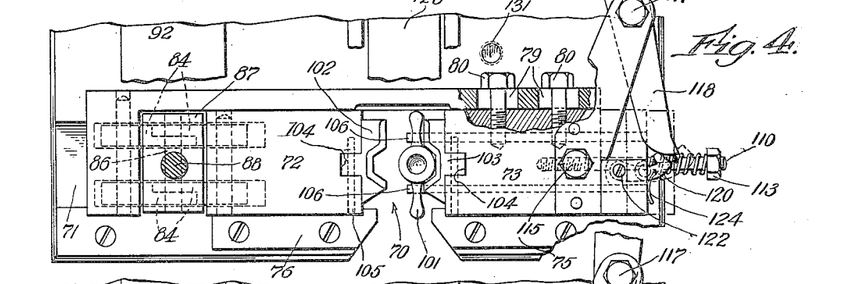
Fig. 4 is a fragmentary plan view partly in horizontal section of the construction shown in Fig. 3 and showing the parts in another position when the work is inserted for clamping action by the jaws.

In the operation of the device as described, a differential movement or variation in movement is established between the slides 72 and 73 and the block or floating head 109 supporting the pawl 120 and with the drill in its normal inoperative position or elevated, the jaws 102 and 103 together with the slides 72 and 73 are normally separated as shown in Figs. 2, 3 and 4 of the drawings. In this position, the connection between the slide housing or casing 33 and the toggled joints comprising the links 84, is also elevated with the normal elevation or return of the parts under the action of the weight to a raised position, the links of the toggle joints being disposed in obtuse angled relation extending upwardly in inclined positions as more clearly shown in Fig. 2 of the drawings. In this position, the slides 72 and 73 and the jaws 102 and 103 attached thereto, are retracted to separate the jaws but in such a manner as to allow a slight differential movement or variation in movement between the drill slide or slide housing 33 and the toggle connection through the medium of the plunger 62 and the spring 61, especially on the downward movement in that while the arm 47 always moves with the housing 33, the spring 61 permits the plunger 62 and stem 63 to move upwardly independently of the arm or the arm 47 and housing 33 and drill or other tool to move downwardly independently of the stem 63 with the tube 57 and the bottom piece 59 moving over the plunger 62 and stem 63 after the links 84 have been actuated to operate the jaws 102—103 to clamp the work thereby accommodating different shaped or sized articles to be operated upon and to permit or compensate for different degrees of movement of the drill or other tool in operating upon the work and in withdrawing therefrom before the holding jaws 102—103 or release from the holding position against the work. In this position, the dog 118 is disposed outwardly of the pawl 120 as shown in Fig. 3 of the drawings, the jaws being normally separated and the pins 106 projecting inwardly beyond the jaws as shown in Fig. 4 of the drawings. In this position the work to be operated on or tapped is placed upon the pins 106 in contact with one of the jaws, such as the jaw 103, as shown in Fig. 4 of the drawings. The operator then grasps the handle 36 in the usual manner and operates the same to lower the drill 38 into the drill guide bushing 125. Simultaneously with this motion, downward movement is imparted to the arm 47, which motion is transmitted through the connection between the arm 47 and the toggle links 84, including the rod 50, spring 61, plunger 62, stem 63, coupling 98 and rod 88 to the block 87, to depress the latter into the opening between the slide 72 and the block or slide extension 77 connected to the slide 73 by the extension or rear connection 78. As the links 84 move downwardly into horizontal alignment, the connections 83 are moved outwardly to move the slide 77 to the left and the slide 72 to the right as viewed in the drawings, thus separating these parts and through the connection of the block 77 with the slide 73 by means of the extension 78, to retract or move the jaws 102 and 103 with the slides 72 and 73 respectively, toward each other. This causes the jaws 102 and 103 to move together in clamping relation and to grip the work 101 as clearly shown in Fig. 5 of the drawings.

Figures 5, 5A, 6:
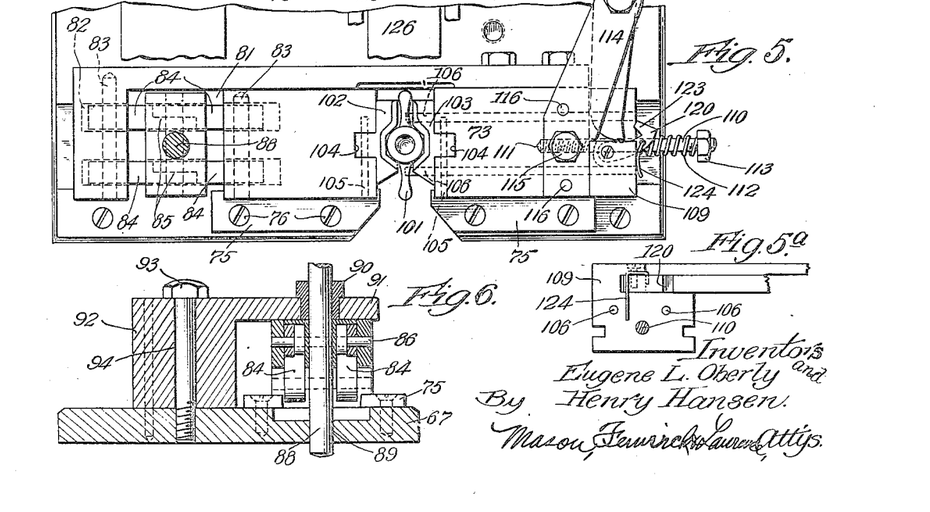
Fig. 5 is a similar view but showing the machine operated to grip the work between the jaws and the operating dog for releasing the work in another position upon the drill being operated to engage the work and elevated upon the completion of the tapping or other operation.
Fig. 5A is a fragmentary end view looking toward the left in Fig. 5 to illustrate the operation and relation of the dog to the work releasing device and associated parts.
Fig. 6 is a fragmentary vertical sectional view taken on the plane of the section line 6—6 in Fig. 2.
Figure 8:
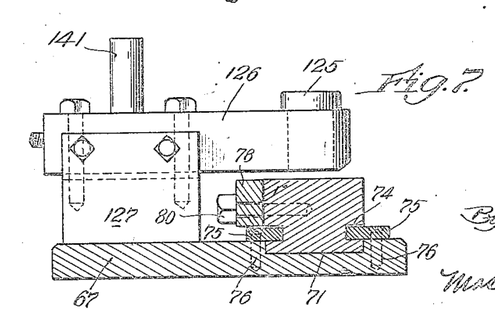

During this motion of the slides, and particularly the slide 73, the arm 114 has moved therewith so that the dog 118 will pass inwardly of or behind the pawl 120 as also shown in Fig. 5 of the drawings, the dog snapping over the pawl owing to the resilient action of the spring 124 permitting the pawl to retract in the slot 121 in the block or floating head 109. During this operation, the drill is brought into position to operate upon the work for the required tapping operation or otherwise, and upon completion thereof the operator raises the drill 38 by release of the handle 36 whereby the drill is automatically raised together with the connection between the arm 47 and the toggle joint. This motion permits the jaws to separate due to the angular movement of the toggle joint at the connection 86 moving upwardly, the motion being cushioned and a differential being established through the medium of the spring 61 and the plunger 62, owing to the fact that the plunger can move upwardly to compress the spring 61 within the housing or tube 57 as in the downward movement of the parts to grip the work while the drill is moved, i. e. raised or lowered positively. This connection and the relative movements of the parts may be adjusted by adjustment of the stem 63 and rod 88 in the coupling 98, the adjustment being accomplished by tightening the screws 100 at the desired points as it is thought will be understood.

Owing to the separation of the slides 72 and 73 and the jaws 102 and 103 by the movement just described, after the dog 118 has previously moved in to the position shown in Fig. 5 of the drawings inwardly of the pawl 120, said dog will be in a position to move outwardly and will engage the pawl 120 whereby the floating head or block 109 will be moved outwardly against the compression of the spring 112, on the guide rod 110 and in doing so, will withdraw the pins 106 from beneath the work 101 and release the latter so that the same may drop into the chute 107 for delivery of the finished work at one side of the machine in a suitable receptacle as previously pointed out. This operation will be automatic and will obviate the necessity of removing the work manually, thereby requiring only that the work be inserted manually for the tapping or other operation while the gripping of the work and the release thereof will be automatic with the lowering and raising of the drill for carrying on the work and releasing the drill after the same has been completed, as described. This provides for efficiency and economy, and facilitates the tapping operation or other work, thereby permitting quantity production at low cost, as well as admirably assisting the operator and avoiding injury as well as relieving the operator of the necessity of removing the work manually. After the work has been released, the dog 118 will pass beyond the pawl 120 due to the action of the spring 124, thereby passing over the end 123 and releasing the parts from the dotted line position shown in Fig. 4 of the drawings so that the spring 112 can react to move the floating head or block 109 inwardly and thereby project the pins 106 from the jaw 103 to again receive a piece of work to be operated on. The relative movement between the jaws and the slides 72 and 73 can be adjusted through the medium of the clamping screws 80 in the slots 79 as previously set forth and explained in connection with Fig. 4 of the drawings. It is to be noted that the slides when mounted as described and shown in Figs. 6 and 7 of the drawings, will facilitate manufacture and assemblage of the parts of the device and will also permit convenient lubrication so that the parts will work uniformly and without undue friction. It will also be obvious that the action of gripping and releasing the work will be accomplished by lowering the tool and upon the release of the handle 36 to permit the elevation thereof by the usual weight provided on such drills through the medium of the flexible connection 39 passing over the pulley 40 as hereinbefore explained. This will obviate the necessity of an additional operation other than lowering and raising the tool for releasing the same to permit automatic elevation thereof, in carrying on the tapping or other operation.

Figure 13:
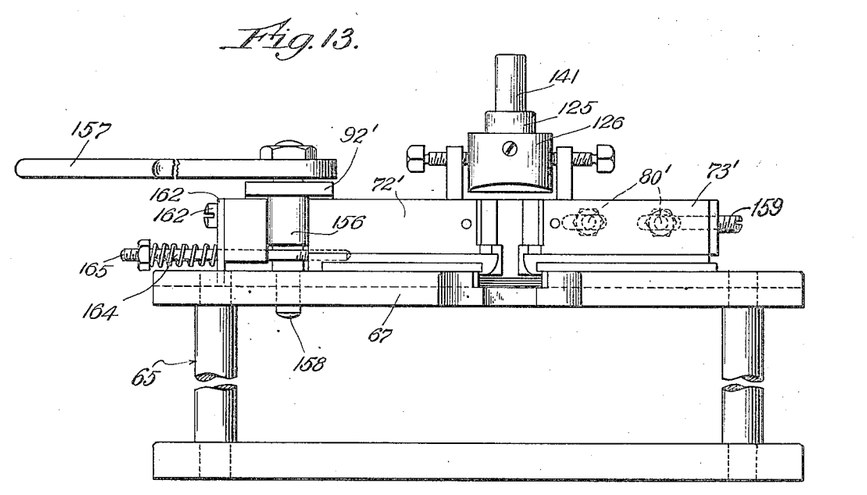
Fig. 13 is a front elevation of another form of the device adapted for the operation of the jaws and release of the work by a separate handle in lieu of connecting the same with the drill to operate the jaws upon the lowering and elevation of the drill chuck and drill, as shown in Fig. 1 of the drawings.
Figure 14:
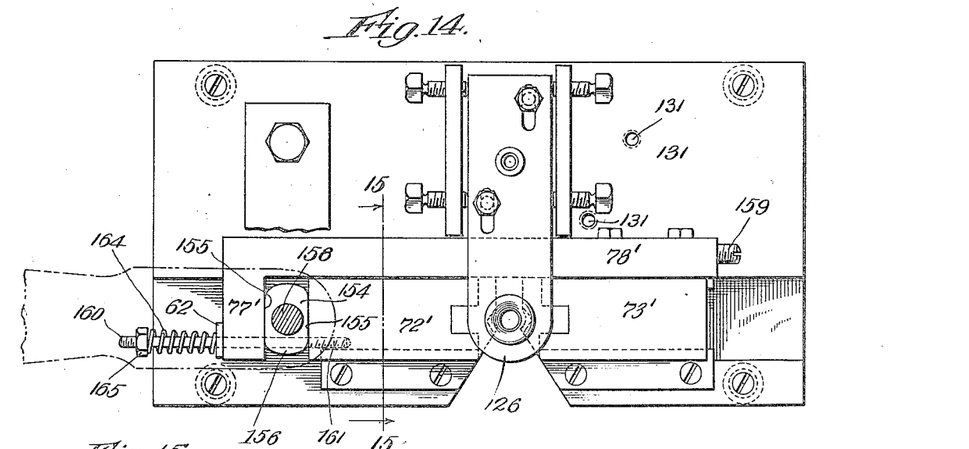
Fig. 14 is a plan view of the construction shown in Fig. 13 of the drawing, the same being partly in horizontal section.
Figure 15:
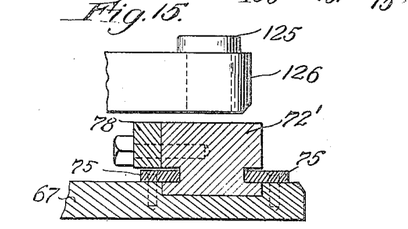
Fig. 15 is a fragmentary sectional view taken on the line 15—15 of Fig. 14.

However, in Figs. 13, 14 and 15 of the drawings, a form of the device is shown in which an operating handle is provided independent of the raising and lowering of the tool for the purpose of gripping and releasing the work. In this form, the construction is the same as that previously described, except that the connection between the drill slide 33 and the toggle connection is omitted, together with the actuating means for the pins 106.

In this form, the slide 72′ co-operates with a slide 73′ and an extension 78′ is connected to the slide 73′ and has a forwardly extending portion or block 77′ spaced from the outer or left hand end of the slide 72′ for receiving a cam 154 having two flattened sides oppositely disposed and two oppositely disposed camming sides or extensions 155 and 156 respectively. A handle 157 for operating the cam is connected to the rod or pivot axis 158 of the cam, which is journalled in the arm or plate 92′ and the head or top plate 67 of the jig frame 65. The extension 78′ is adjustably connected to the slide 73′ as previously explained, and as shown in Fig. 13 of the drawings, the adjustment being anchored by a set screw 159 extending longitudinally into the end of the extension 78′ and engaging one of the set screws 80′ for this purpose. It is of course, to be understood that a threaded opening is tapped longitudinally in the extension 78' from the right hand end as viewed in Figs. 13 and 14 for receiving the set screw 159. Furthermore, a threaded rod 160 is disposed through or beneath the block 77' and engaged in the slide 72' as indicated at 161 so as to be rigid with the slide 72' and the block 77' may be slightly spaced from the top plate 67 as clearly shown in Fig. 13 of the drawings. However, a depending guide plate 162 is secured as by means of a screw 163 to the adjacent end face of the lateral extension or block 77' to receive the rod 160 and a coil spring 164 normally under tension, is disposed between the block or plate and a nut 165 threaded on the rod 160 to adjust the tension of the spring 164. Thus, when the tool is lowered into the drill guide bushing after the work has been inserted between the jaws, the handle 157 is swung in either direction but preferably pulled forwardly to turn the cam 154 whereby the camming portions 155 and 156 will be disposed in a position at right angles to that shown in Fig. 14 of the drawings to spread or separate the parts 72' and 77', thus moving the slides 72' and 73' and the jaws carried thereby into clamping position and engagement with respect to the work to be operated on. The cam will remain in this position until the work is completed, the spring 164 being compressed so that upon release of the handle 157 and movement thereof automatically to the normal position shown in Figs. 13 and 14 of the drawings, to turn the cam to the position shown in Fig. 14 of the drawings, the jaws will be separated together with the slides 72' and 73' to release the work for discharge into the chute as previously explained. This operation merely requires the lowering of the tool for the tapping or other operation and the swinging of the handle 157 by the operator, the lowering of the tool being accomplished with the right hand and the operation of the handle or lever 157 with the left hand. The spring 164 by reason of being placed under tension when the jaws are moved together for clamping the work, will act to separate the jaws when the parts 72' and 77' are moved together due to the change in position of the cam from a spreading to a retracting position. In either case, a differential movement will be established between the slides and the operating means, namely, the connection between the arm 47 and the slides in one instance through the medium of the toggle joint and the handle and the slide through the medium of the cam in the other instance.

While we have described the forms of our invention which we consider at the present time to constitute the preferred embodiments, it is to be understood that many changes in the details of constructions, arrangements and connection of the parts as well as their form, may be resorted to without departing from the spirit and scope of the invention as will be defined and claimed hereinafter. In either instance, the work may be carried on expeditiously and economically. It is also to be understood that the arm 126 carrying the drill guide bushing 125 may be mounted in any other suitable manner for vertical and lateral adjustment, and that it may be supported on the slide 73 and similarly adjustable longitudinally and laterally as is provided by the set screws 129. It is also to be understood that the spring 61 is sufficiently strong to exert enough tension to insure operation of the drill should the same strike unusual friction or pressure tending to resist its operation in the work, instead of stopping or turning backward. The spring is made strong enough to overcome resistance of the tool in case of catching of the tool on the work and may be in the form of a short spring directly interposed between the arm 47 and the rod 88, in which case the piston or plunger 62 is omitted. When the drill is raised, the spring continues to hold until the drill is entirely out of the work. This will insure proper operation of the drill. It is also to be understood that any suitable means may be provided for clamping, holding and supporting the work in the jaws.

Having thus described our invention, what we claim and desire to secure by Letters Patent of the United States of America is:

1. In a semi-automatic drill and tapping jig, a drill having a movable drill holder adapted to be moved into and out of operative position, an adjustable table for holding the work being operated on, a jig frame mounted upon the table, a drill guide supported by the jig frame, a bushing mounted in the drill guide through which the drill is adapted to operate, oppositely movable gripping members beneath the drill guide for receiving the work, means for supporting the work in position to be held by the gripping members and for releasing the work consisting of retractable and movable pins, the jig frame comprising spaced parallel plates connected in rigid relationship and including a base plate and top plate connected by spacing members, means for supplying liquid to the bushing and drill tool, spring means for holding the supporting pins in operative position, means connecting the jaws with the tool holder whereby the lowering of the drill will move the jaws to gripping position and the raising of the tool holder will separate the jaws.

2. A semi-automatic jig comprising in combination with a drilling and tapping machine having a tool feeding holder, a bed, clamping member slidably secured to the bed, one clamping member of substantially U shape having the inner face of one leg formed to grip the work, the other clamping member shorter than the space between the legs of the first and positioned to slide therebetween and having one end face formed to grip the work in conjunction with one leg of the first member, means operative between the other leg of the first clamping member and the other end of the second clamping member to separate said parts, and means connecting said jaw operative means with the tool holder including a lost motion connection.

3. The structure of claim 2 with pins slidable in one of the gripping jaw members to support the work, means for holding said pins normally extended between the gripping jaws, lever means on a fixed pivot adapted to engage and retract the pins, and means connecting the gripping jaw to the lever to rock the same.

4. A semi-automatic jig comprising in combination with a drilling and tapping machine having a tool feeding holder, jaws slidable toward and away from each other to grip and release the work, means operative of the jaws connected to the tool feeding holder, pins slidable in one of the jaws to support the work, means normally holding the pins extended between the jaws, a pawl associated with the pins, a lever having a fixed pivot adapted to engage the pawl to retract the pins, and an arm carried by a clamping jaw pivoted to the lever, whereby the sliding of the jaw to release the work, rocks the lever to retract the supporting pins as specified.

In testimony whereof we affix our signatures.

EUGENE L. OBERLY.
HENRY HANSEN.